(12) United States Patent
Jun et al.

(10) Patent No.: US 8,594,689 B2
(45) Date of Patent: Nov. 26, 2013

(54) APPARATUS AND METHOD FOR RESOURCE ALLOCATION FOR FREQUENCY OVERLAY SCHEME IN A BROADBAND WIRELESS COMMUNICATION SYSTEM

(75) Inventors: Byung-Wook Jun, Seoul (KR); Jae-Hee Cho, Seoul (KR); Kwan-Hee Roh, Hwaseong-si (KR); Hee-Kwun Cho, Incheon (KR); Sang-Min Lee, Seoul (KR); Hyun-Jeong Kang, Seoul (KR); Pisut Sanyadechukal, Suwon-si (KR); Soon-Young Yoon, Seoul (KR); Hee-Won Kang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 605 days.

(21) Appl. No.: 12/459,535

(22) Filed: Jul. 2, 2009

(65) Prior Publication Data

US 2010/0003996 A1   Jan. 7, 2010

(30) Foreign Application Priority Data

Jul. 3, 2008   (KR) .................. 10-2008-0064170

(51) Int. Cl.
*H04W 72/00* (2009.01)
(52) U.S. Cl.
USPC ......... 455/452.1; 455/450; 455/451; 455/464

(58) Field of Classification Search
USPC .............. 455/509, 561, 450–452.2; 370/344, 370/243, 260, 252, 254, 267, 203
See application file for complete search history.

(56) References Cited

U.S. PATENT DOCUMENTS

| 2002/0176364 | A1* | 11/2002 | Nakamura et al. | 370/243 |
| 2003/0017832 | A1* | 1/2003 | Anderson et al. | 455/456 |
| 2004/0105422 | A1* | 6/2004 | Sahni et al. | 370/351 |
| 2006/0291414 | A1* | 12/2006 | Lim et al. | 370/329 |
| 2008/0013599 | A1* | 1/2008 | Malladi | 375/132 |
| 2008/0102846 | A1* | 5/2008 | Kim et al. | 455/450 |
| 2008/0212556 | A1* | 9/2008 | Heo et al. | 370/344 |
| 2008/0233966 | A1* | 9/2008 | Scheim et al. | 455/452.1 |
| 2009/0042581 | A1* | 2/2009 | Liu et al. | 455/450 |
| 2009/0073929 | A1* | 3/2009 | Malladi et al. | 370/329 |
| 2010/0260036 | A1* | 10/2010 | Molnar et al. | 370/203 |

* cited by examiner

*Primary Examiner* — Kent Chang
*Assistant Examiner* — William Lu

(57) ABSTRACT

A broadband wireless communication system supporting a frequency overlay scheme is provided. An operating method of a base station includes allocating relative addresses to Resource Blocks in at least one operating Frequency Assignment (FA) of a terminal according to an addressing scheme for the terminal; generating at least one resource indicator represented with the relative addresses; generating resource allocation information which comprises the at least one resource indicator; and transmitting the resource allocation information through a primary FA of the terminal.

22 Claims, 14 Drawing Sheets

APPARATUS AND METHOD FOR RESOURCE ALLOCATION FOR FREQUENCY OVERLAY SCHEME IN A BROADBAND WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jul. 3, 2008 and assigned Serial No. 10-2008-0064170, the entire disclosure of which is hereby incorporated by reference.

TECHNICAL FIELD OF THE INVENTION

The present application relates generally to a broadband wireless communication system. More particularly, the present invention relates to an apparatus and a method for allocating resources for a frequency overlay scheme in the broadband wireless communication system.

BACKGROUND OF THE INVENTION

The $4^{th}$-generation (4G) communication system, which is a future communication system, is advancing to providing users with services of various Quality of Service (QoS) levels at a transfer rate of about 100 Mbps. Its representative examples include an Institute of Electrical and Electronics Engineers (IEEE) 802.16 communication system. The IEEE 802.16 communication system adopts Orthogonal Frequency Division Multiplexing (OFDM)/Orthogonal Frequency Division Multiple Access (OFDMA) scheme to support a broadband transmission network in physical channels.

To support terminals of different available bandwidths at the same time, the broadband wireless communication system can adopt a frequency overlay scheme. The frequency overlay scheme supports the terminals that use different bandwidths, using a plurality of Frequency Assignments (FAs). For example, a base station 101 divides the whole band into two 10-MHz FAs 110 and 120 and supports one or two FAs according to a supportable bandwidth of the terminal as illustrated in FIG. 1. A terminal A 103 can use two FAs and a terminal B 105 can use only one FA. Accordingly, the base station 101 communicates with the terminal A 103 through the first FA 110 and the second FA 120, and communicates with the terminal B 105 through the second FA 120.

Typically, when the multiple FAs are used, each FA confirms to the independent frame structure. Thus, the resource allocation in each FA is independently carried out and a MAP message for informing of the resource allocation result is provided per FA. Yet, when one terminal makes use of the multiple FAs at the same time as in the frequency overlay scheme, the terminal needs to check the multiple MAP messages received in the FAs. That is, the resource allocation information for one terminal is delivered through the multiple MAP messages. As a result, the resource allocation information for the terminal using the multiple FAs increases in proportion to the number of the FAs in use and thus the MAP messages increases overhead.

SUMMARY OF THE INVENTION

To address the above-discussed deficiencies of the prior art, it is a primary aspect of the present invention to provide an apparatus and a method for allocating resources for a frequency overlay scheme in a broadband wireless communication system.

Another aspect of the present invention is to provide an apparatus and a method for generating resource allocation information in a structure irrelevant to the number of frequency assignments used in a broadband wireless communication system.

Another yet aspect of the present invention is to provide an apparatus and a method for establishing a resource indication system which changes based on a FA in use in a broadband wireless communication system.

Another still aspect of the present invention is to provide an apparatus and a method for sharing the same resource indication system between a base station and a terminal in a broadband wireless communication system.

According to one aspect of the present invention, an operating method of a base station in a broadband wireless communication system supporting a frequency overlay scheme includes allocating relative addresses to Resource Blocks (RBs) in at least one operating FA of a terminal according to an addressing scheme for the terminal, generating at least one resource indicator represented with the relative addresses, generating resource allocation information which comprises the at least one resource indicator, and transmitting the resource allocation information through a primary FA of the terminal.

According to another aspect of the present invention, an operating method of a terminal in a broadband wireless communication system supporting a frequency overlay scheme includes reading at least one resource indicator contained in resource allocation information for the terminal, allocating relative addresses to RBs in at least one operating FA of the terminal according to an addressing scheme for the terminal, determining an absolute address of the RB indicated by the at least one resource indicator using the relative addresses, and receiving data over the RB corresponding to the absolute address.

According to yet another aspect of the present invention, an apparatus of a base station in a broadband wireless communication system supporting a frequency overlay scheme includes a setter for allocating relative addresses to RBs in at least one operating FA of a terminal according to an addressing scheme for the terminal, a generator for generating at least one resource indicator represented with the relative addresses and generating resource allocation information which comprises the at least one resource indicator, and a transmitter for transmitting the resource allocation information through a primary FA of the terminal.

According to still another aspect of the present invention, an apparatus of a terminal in a broadband wireless communication system supporting a frequency overlay scheme includes a setter for allocating relative addresses to RBs in at least one operating FA of a terminal according to an addressing scheme for the terminal, a generator for generating at least one resource indicator represented with the relative addresses and generating resource allocation information which comprises the at least one resource indicator, and a transmitter for transmitting the resource allocation information through a primary FA of the terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
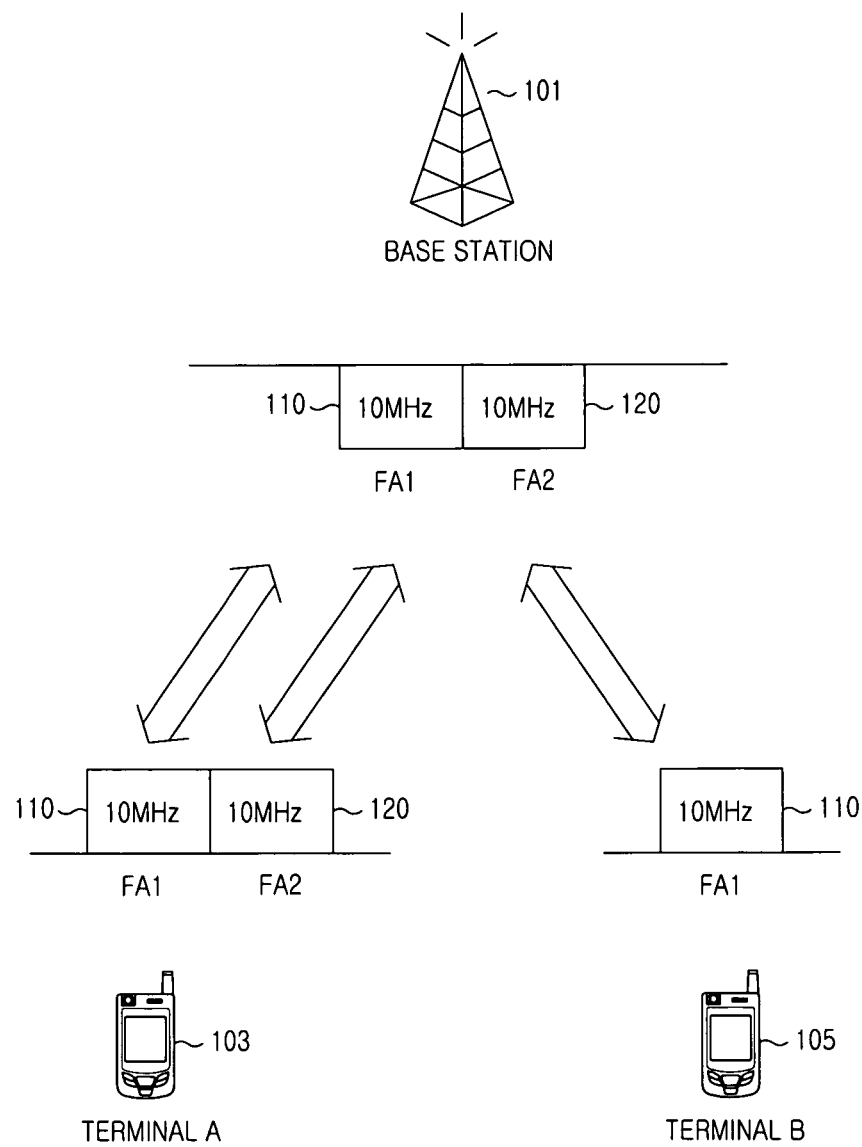
FIG. 1 illustrates FA usage according to a frequency overlay scheme in a broadband wireless communication system.

FIGS. 2A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a resource allocation technique for a frequency overlay scheme in a broadband wireless communication system. Hereinafter, an OFDM/OFDMA wireless communication system is illustrated by way of example. It will be understood that the present invention is applicable to other various wireless communication systems.

The resource allocation of the present invention is explained by referring to the drawings. Since the broadband wireless communication system of the present invention supports the frequency overlay scheme, there exist terminals using the different numbers of Frequency Assignments (FAs). Specifically, when a base station uses four FAs, the base station can support a terminal using one FA, a terminal using two FAs, a terminal using three FAs, and a terminal using four FAs. Depending upon the number of the FAs in use, the amount of the available resource of the terminal is determined. The FA in use determines the location of the available resource of the terminal.

In the system of the present invention, the resource is allocated on a Resource Block (RB) basis. The RBs in the frame have a one-dimensional array structure. Hence, resource allocation information includes an identifier of the terminal, a resource indicator, and a Modulation and Coding Scheme (MCS) level. Herein, the resource indicator indicates at least one RB allocated according to one of a start and length scheme, a run-length scheme, a run-length scheme, a triangle-based scheme, and a pattern-based scheme of the resource.

Figure 2A:
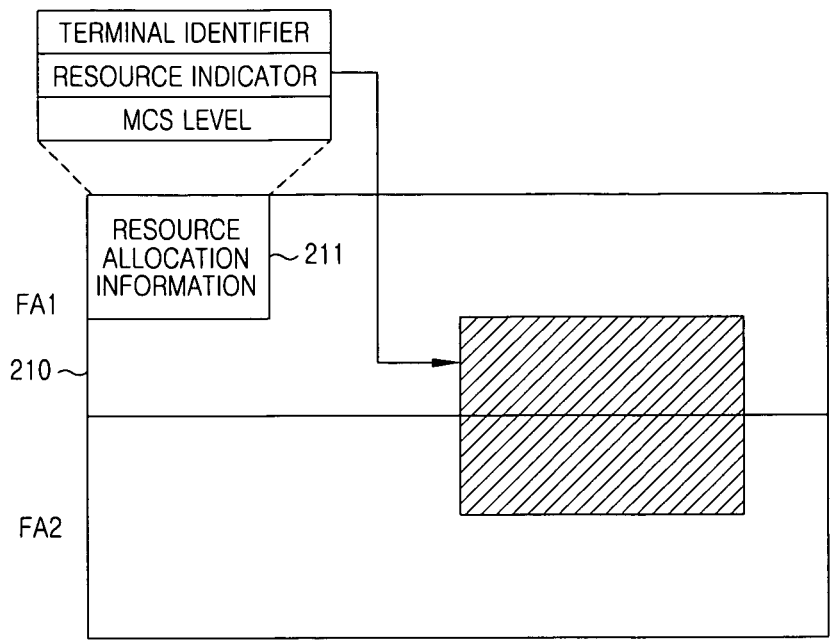
FIGS. 2A and 2B illustrate indication of a resource distributed to a plurality of FAs in a broadband wireless communication system according to an exemplary embodiment of the present invention.
Figure 2B:
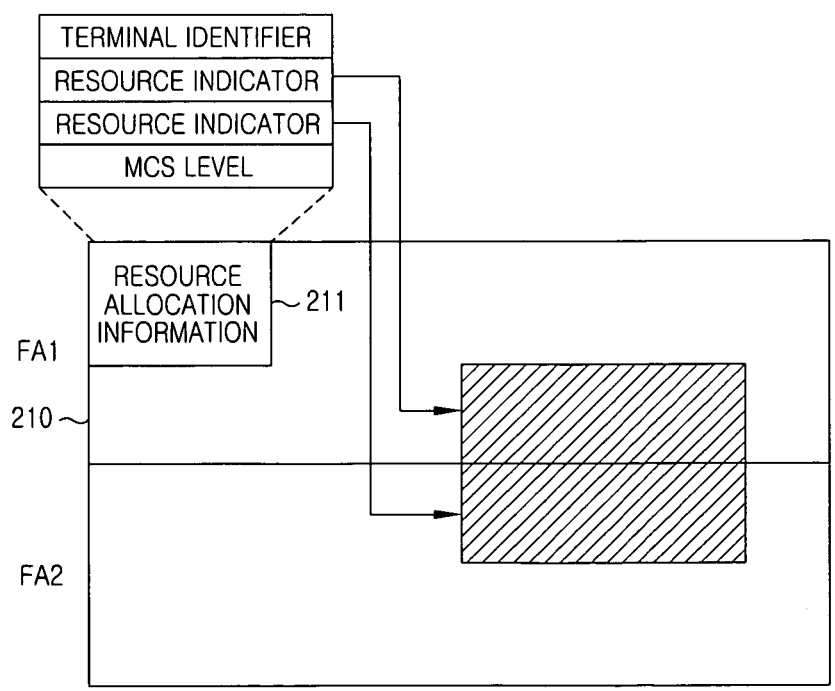

The resource allocation information is delivered through MAP transmitted in a primary FA of the destination terminal of the resource allocation information. For example, when the resource allocated to the terminal compliant with the frequency overlay scheme is distributed to two FAs, as illustrated in FIGS. 2A and 2B, the resource allocation information 211 for the terminal is transmitted through the first FA 210 that is the primary FA of the terminal. The base station can include only one resource indicator to the resource allocation information 211 for the terminal as illustrated in FIG. 2A, or include two resource indicators; that is, one resource indicator per FA as illustrated in FIG. 2B.

To indicate the resource distributed to the multiple FAs using the single resource indicator as shown FIG. 2A, it is necessary to define an addressing scheme for the multiple FAs. The addressing scheme should differ according to the number of the FAs in use. The base station and the terminal utilize the addressing scheme corresponding to frequency overlay capability of the terminal and the number of the FAs allocated based on the frequency overlay capability.

The addressing scheme based on the number of the FAs is described by referring to FIGS. 3 through 6. In FIGS. 3 through 6, $r_{i,j}$ denotes the j-th RB of the i-th FA and N denotes the number of RBs in one FA. Hereafter, $r_{i,j}$ is referred to as an absolute address of the RB and the relative address of the RB assigned by the addressing scheme is referred to as a relative address.

Figure 3:
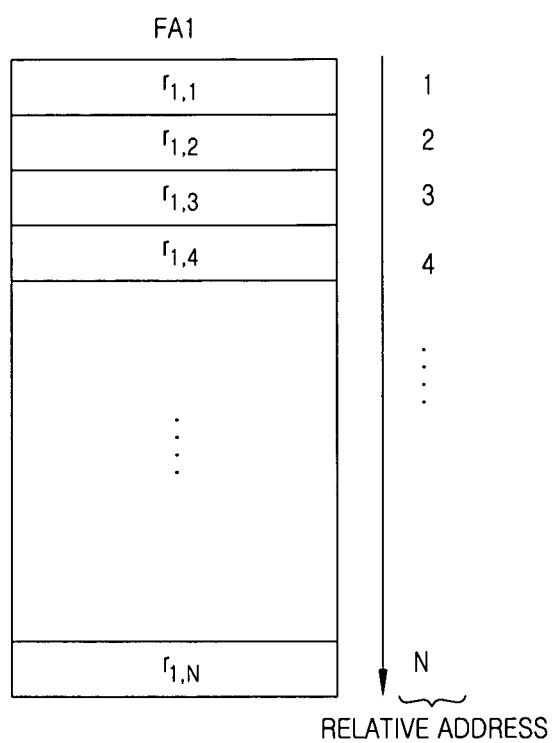
FIG. 3 illustrates relative address allocation when one FA is employed in the broadband wireless communication system according to an exemplary embodiment of the present invention.

When a single FA is employed, the addressing scheme is illustrated in FIG. 3. The relative addresses are allocated in order along the direction of the arrow. That is, the relative addresses are assigned according to the system of the absolute addresses. For example, the relative address of $r_{i,j}$ is j in FIG. 3. The relative addresses given to the RBs are arranged in Table 1.

TABLE 1

| Absolute address | $r_{1,1}$ | $r_{1,2}$ | $r_{1,3}$ | $r_{1,4}$ | ... | $r_{1,N}$ |
|---|---|---|---|---|---|---|
| Relative address | 1 | 2 | 3 | 4 | ... | N |

Figure 4:
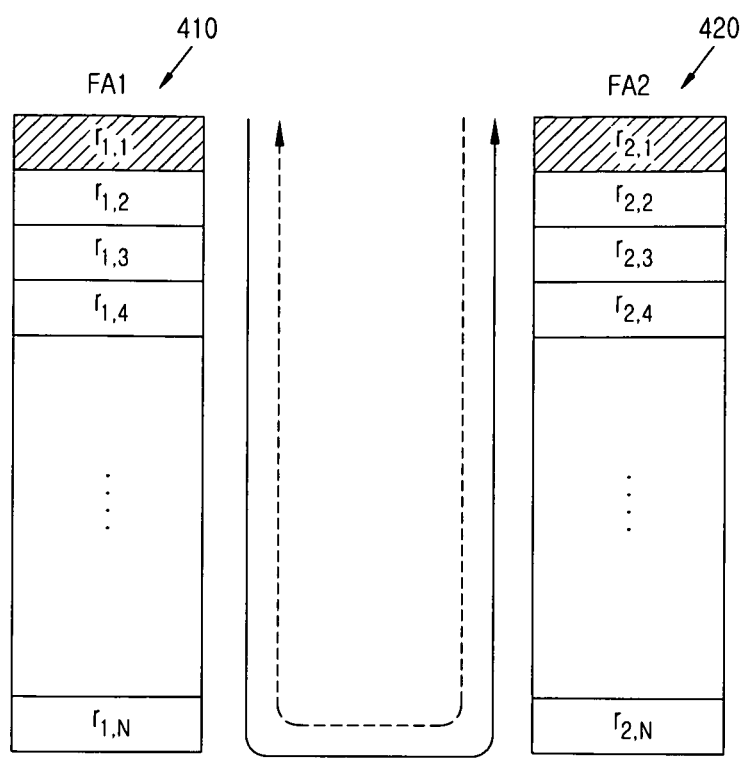
FIG. 4 illustrates relative address allocation when two FAs are employed in the broadband wireless communication system according to an exemplary embodiment of the present invention.

When two FAs are employed, the addressing scheme is illustrated in FIG. 4. The relative addresses are allocated to the RBs in the two FAs in order along the direction of the arrow. The addressing direction varies according to exemplary embodiments of the present invention. For example, along the solid arrow, the relative addresses can be allocated in the forward direction in the FA1 410 and in the backward direction in the FA2 420. Alternatively, along the dotted arrow, the relative addresses can be allocated in the forward direction in the FA2 420 and in the backward direction in the FA1 410. In those two cases, the relative addressing starts at the start point of the forward allocation. Accordingly, in the 2-FA frequency overlay, since the RBs used for the data transmission are not split by the RB used for a preset purpose such as MAP transfer, the relative address allocation does not need location information of the RB used for the preset purpose. The relative addresses given to the RBs in FIG. 4 are arranged in Table 2.

TABLE 2

| Absolute address | $r_{1,1}$ | $r_{1,2}$ | ... | $r_{1,N}$ | $r_{2,N}$ | ... | $r_{2,1}$ |
|---|---|---|---|---|---|---|---|
| Relative address | 1 | 2 | ... | N | N + 1 | ... | 2N |

Figure 5:
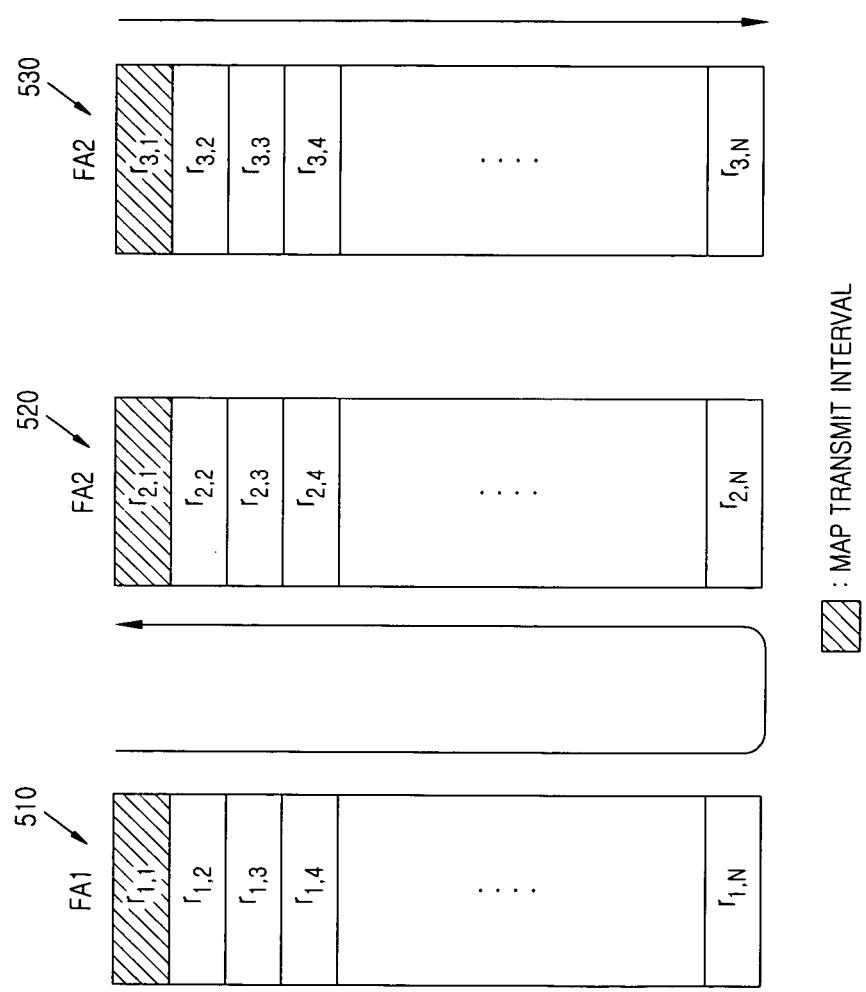
FIG. 5 illustrates relative address allocation when three FAs are employed in the broadband wireless communication system according to an exemplary embodiment of the present invention.

When three FAs are employed, the addressing scheme is illustrated in FIG. 5. The addressing scheme with the three FAs combines the addressing scheme for the one FA and the addressing scheme for the two FAs. In particular, the addressing scheme for FIG. 4 is applied to two FAs and the addressing scheme for FIG. 3 is applied to the other one FA. In FIG. 5, the relative addresses are allocated to all of the RBs of the two FAs in the FA1 510 and the FA2 520, and the relative addresses are allocated to the FA3 530 separately from the relative addresses of the FA1 510 and the FA2 520. In the 3-FA frequency overlay, two resource indicators including a resource indicator for the FA1 510 and the FA2 520 and a resource indicator for the FA3 530 are utilized. Note that the FAs managed by one resource indicator may not be physically adjacent to each other. The relative addresses given to the RBs in FIG. 5 are arranged in Table 3 and Table 4.

TABLE 3

| Absolute address | $r_{1,1}$ | $r_{1,2}$ | ... | $r_{1,N}$ | $r_{2,N}$ | ... | $r_{2,1}$ |
|---|---|---|---|---|---|---|---|
| Relative address | 1 | 2 | ... | N | N + 1 | ... | 2N |

TABLE 4

| Absolute address | $r_{3,1}$ | $r_{3,2}$ | $r_{3,3}$ | $r_{3,4}$ | ... | $r_{3,N}$ |
|---|---|---|---|---|---|---|
| Relative address | 1 | 2 | 3 | 4 | ... | N |

Figure 6:
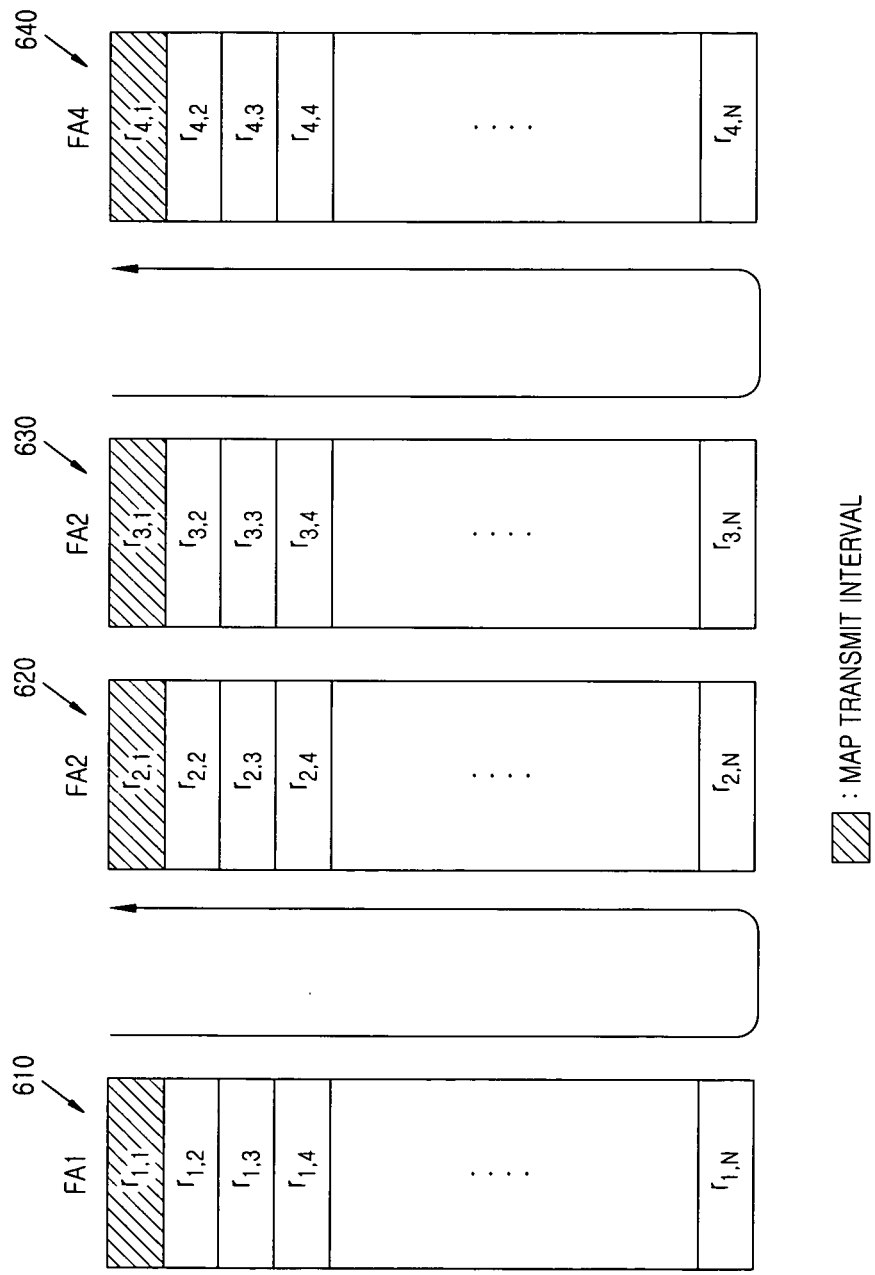
FIG. 6 illustrates relative address allocation when four FAs are employed in the broadband wireless communication system according to an exemplary embodiment of the present invention.

When four FAs are employed, the addressing scheme is illustrated in FIG. 6. The addressing scheme with the four FAs is extended from the addressing scheme for the two FAs. In particular, the four FAs are divided to pairs each including two FAs and the addressing scheme for FIG. 4 is applied to each FA pair. In FIG. 6, the relative addresses are allocated to all of the RBs of the two FAs in the FA1 610 and the FA2 620, and the relative addresses are allocated in the FA3 630 and the FA4 640 separately from the relative addresses of the FA1 610 and the FA2 620. In the 4-FA frequency overlay, two resource indicators including a resource indicator for managing the FA1 610 and the FA2 620 and a resource indicator for managing the FA3 630 and the FA4 640 are used. Note that the FAs managed by one resource indicator; that is, the FAs belonging to one FA pair, may not be physically adjacent to each other. The relative addresses given to the RBs in FIG. 6 are arranged in Table 5 and Table 6.

TABLE 5

| Absolute address | $r_{1,1}$ | $r_{1,2}$ | ... | $r_{1,N}$ | $r_{2,N}$ | ... | $r_{2,1}$ |
|---|---|---|---|---|---|---|---|
| Relative address | 1 | 2 | ... | N | N + 1 | ... | 2N |

TABLE 6

| Absolute address | $r_{3,1}$ | $r_{3,2}$ | ... | $r_{3,N}$ | $r_{4,N}$ | ... | $r_{4,1}$ |
|---|---|---|---|---|---|---|---|
| Relative address | 1 | 2 | ... | N | N + 1 | ... | 2N |

Although it is not specifically illustrated in the figures, the addressing scheme with five FAs is similar to the above-mentioned addressing schemes. Given the odd number of the FAs, the addressing scheme for one FA and the addressing scheme for two FAs are combined. Given the even number of FAs, the addressing scheme for two FAs is extended.

As the addressing scheme for FIGS. 3 through 6 is applied, simultaneously, the system of the present invention separately allocates the relative addresses based on the type of the RB. More specifically, when the RBs are divided to diversity RBs and band selective RBs, the relative addresses are allocated in the diversity interval and the band selective interval independently of each other. Herein, the diversity RB indicates an RB including subcarriers physically distributed, and the band selective RB indicates an RB including subcarriers physically adjacent to each other.

Figure 7:
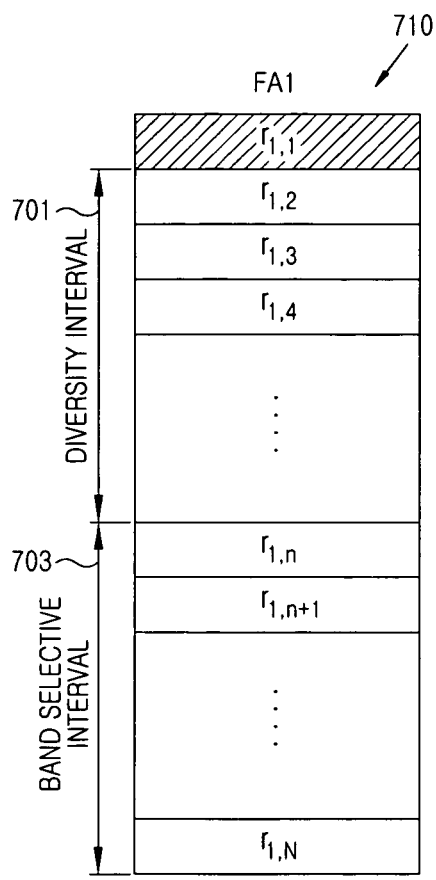
FIG. 7 illustrates relative address allocation when one FA divided to a diversity interval and a band selective interval is employed in the broadband wireless communication system according to an exemplary embodiment of the present invention.
Figure 8:
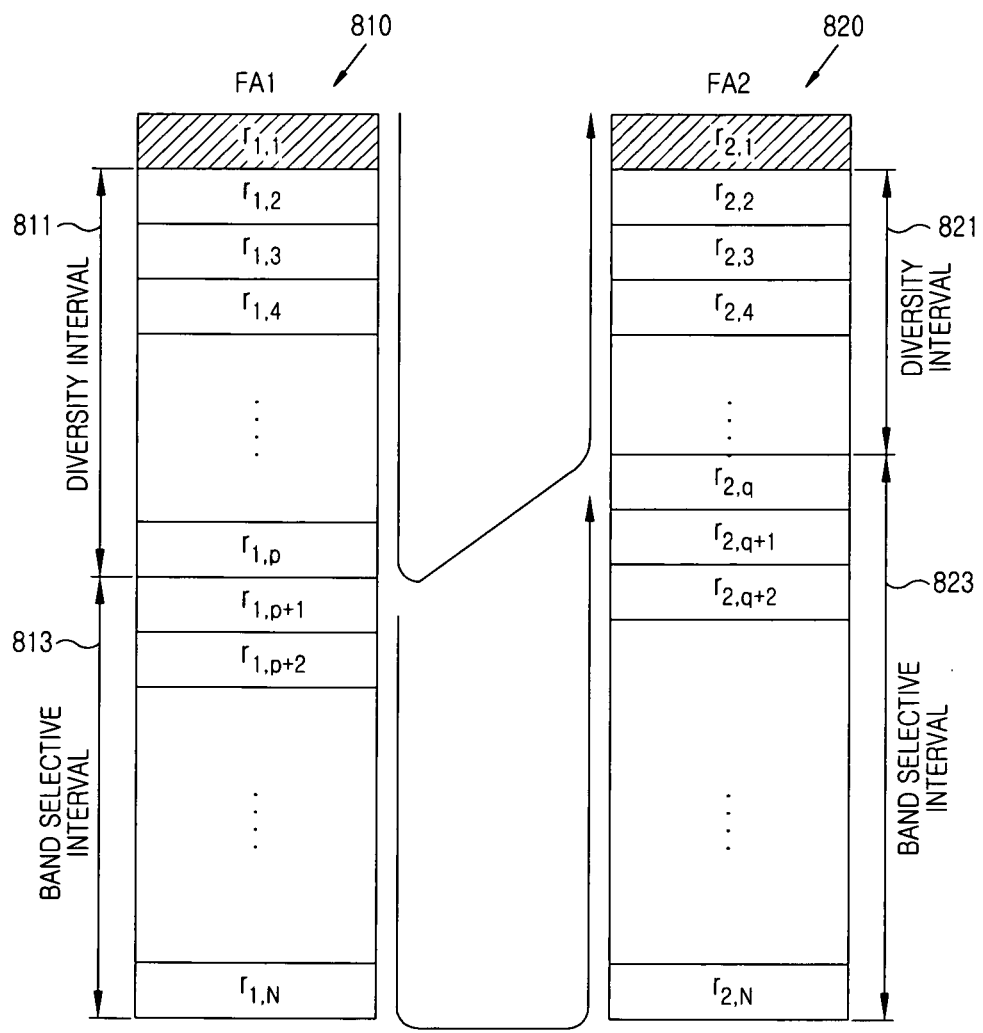
FIG. 8 illustrates relative address allocation when two FAs divided to the diversity interval and the band selective interval are employed in the broadband wireless communication system according to an exemplary embodiment of the present invention.

When a single FA is employed, the addressing scheme per interval is illustrated in FIG. 7. Relative addresses are assigned to the RBs in the diversity interval 701, and relative addresses are separately assigned to the RBs in the band selective interval 703. Hence, when the terminal intends to use all of the diversity RB and the band selective RB, two resource indicators are used. When the two FAs are employed, the addressing scheme per interval is illustrated in FIG. 8. Relative addresses are allocated to RBs in the diversity interval 811 of the FA1 810 and the diversity interval 821 of the FA2 820, and relative addresses are separately allocated to RBs in the band selective interval 813 of the FA1 810 and the band selective interval 823 of the FA2 820. Naturally, when the terminal uses both of the diversity RB and the band selective RB, the two resource indicators are used.

When the RBs are divided into the diversity interval and the band selective interval as illustrated in FIGS. 7 and 8, the terminals need to know a ratio of the diversity interval and the band selective interval in the FA for the relative addressing. When the ratio is variable, the base station informs the terminals of the ratio using a Broadcast Channel (BCH) or MAP.

In addition to the addressing schemes of FIGS. 3 through 8, the system of the present invention also supports the addressing scheme per FA. More specifically, the system of the present invention may apply the independent addressing scheme per FA regardless of the number of the used FAs and employ the resource indicators as many as the FAs. That is, based on the situation, the base station determines whether to apply the addressing scheme for FIGS. 3 through 8. For example, whether to apply the addressing scheme for FIGS. 3 through 8 can be determined by the distribution rate of the terminals having the frequency overlay capability within the cell. To ease the understanding, the independent addressing scheme per FA is referred to as an individual addressing scheme and the addressing scheme for FIGS. 3 through 8 is referred to as an integrated addressing scheme.

To allocate the relative addresses as stated above, the base station needs to determine the FAs to be used by the terminal and the addressing scheme at the initial access of the terminal and inform the terminal of the FAs to be used by the terminal and the addressing scheme. Operations of the base station and the terminal are provided. In the following, to ease the understanding, the FAs to be used by the terminal and the FAs used by the terminal are referred to as operating FAs of the terminal.

Figure 9:
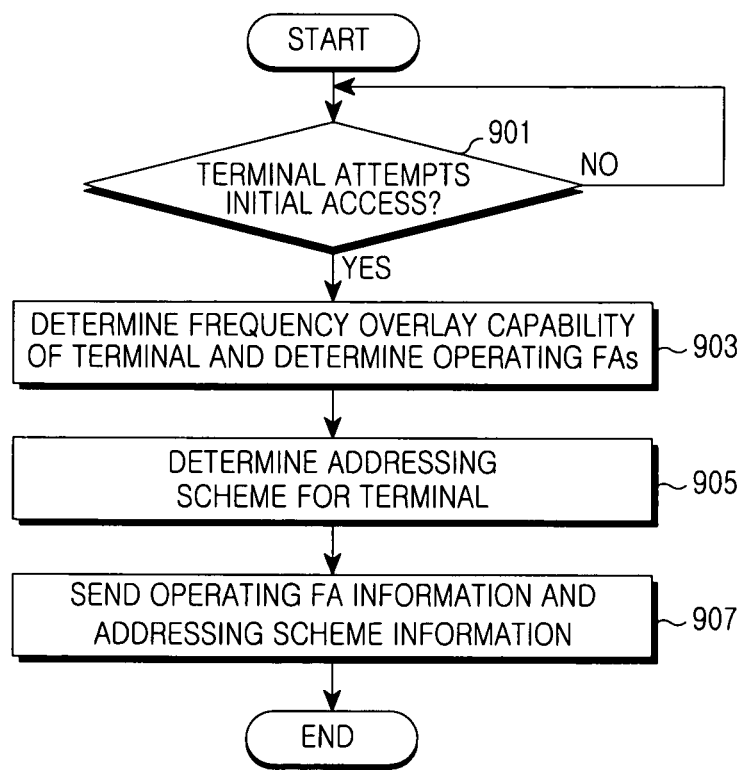
FIG. 9 illustrates an initial access processing method of a base station in the broadband wireless communication system according to an exemplary embodiment of the present invention.

FIG. 9 illustrates an initial access processing method of the base station in the broadband wireless communication system according to an exemplary embodiment of the present invention.

In step 901, the base station determines whether the terminal attempts the initial access. That is, the base station determines whether a ranging code for the initial access is received from the terminal.

In case of the initial access attempt of the terminal, the base station determines the frequency overlay capability of the terminal and determines the operating FAs of the terminal in step 903. That is, the base station determines the frequency overlay capability information of the terminal received from the terminal in the process of the initial access. Next, the base station determines the operating FAs of the terminal; that is, determines how many FAs are supported and which FAs are supported by taking into account the frequency overlay capability and the FA utilization status. For example, the frequency overlay capability information of the terminal is confirmed through a Subscribe station Basic Capability (SBC) procedure.

In step 905, the base station determines the addressing scheme for the terminal. In doing so, the base station first determines whether to apply the individual addressing scheme or the integrated addressing scheme. To apply the integrated addressing scheme, the base station determines the addressing scheme based on the operating FAs of the terminal. Based on the number of the operating FAs, the base station determines to adopt one of the addressing schemes of FIGS. 3 through 6.

In step 907, the base station transmits the operating FA information and the addressing scheme information to the terminal. Herein, the addressing scheme information includes information indicative of the individual addressing scheme or the integrated addressing scheme. Additionally, as for the integrated addressing scheme, the addressing scheme information can include information indicative of a particular addressing scheme. More specifically, when the addressing scheme corresponding to the operating FAs are not agreed in advance or when the addressing scheme is to be confirmed, the addressing scheme information includes the information indicative of the particular addressing scheme.

Figure 10:
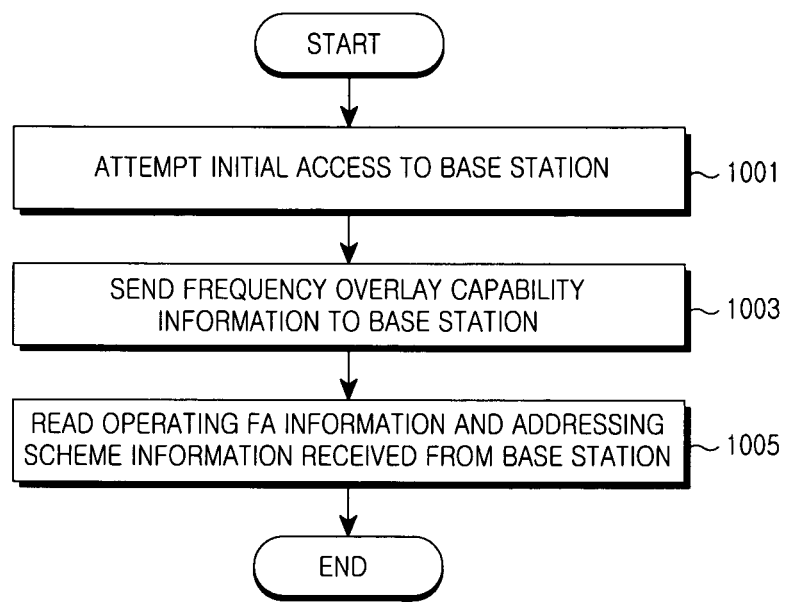
FIG. 10 illustrates an initial access method of a terminal in the broadband wireless communication system according to an exemplary embodiment of the present invention.

FIG. 10 illustrates an initial access method of the terminal in the broadband wireless communication system according to an exemplary embodiment of the present invention.

In step 1001, the terminal attempts the initial access to the base station. That is, the terminal transmits the ranging code for the initial access.

In step 1003, the terminal transmits its frequency overlay capability information to the base station. Namely, the terminal transmits the information relating to the number of the usable FAs. For example, the overlay capability information of the terminal is delivered through the SBC procedure.

In step 1005, the terminal reads the operating FA information and the addressing scheme information received from the base station. Herein, the addressing scheme information includes the information indicative of the individual addressing scheme or the integrated addressing scheme. As for the integrated addressing scheme, the addressing scheme information can further include the information indicative of the particular addressing scheme.

In the embodiment of FIGS. 9 and 10, the base station and the terminal can acquire the operating FAs the addressing scheme based on the operating FAs. Next, the base station and the terminal operate for their data communication as below.

Figure 11:
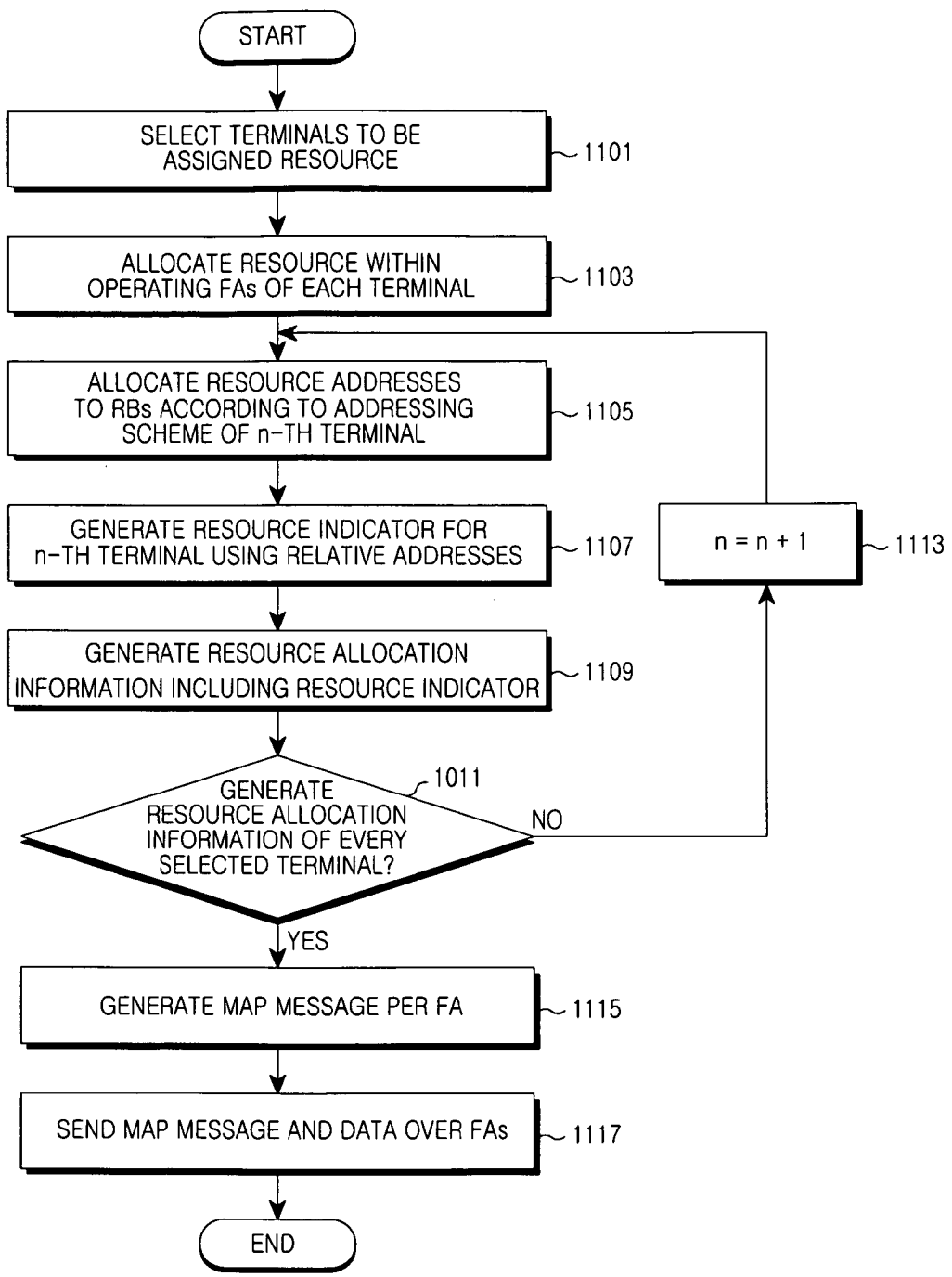
FIG. 11 illustrates a data transmitting method of the base station in the broadband wireless communication system according to an exemplary embodiment of the present invention.

FIG. 11 illustrates a flowchart of a data transmitting method of the base station in the broadband wireless communication system according to an exemplary embodiment of the present invention. FIG. 11 illustrates the resource allocation method and the data transmitting method of the base station in relation with one frame or subframe. It is assumed that the integrated addressing scheme is applied.

In step 1101, the base station selects terminals to be assigned the resource. In particular, the base station selects the terminals to service from the accessed terminals based on scheduling parameters relating to queue statue, channel condition, QoS requirements, frequency overlay capability, and resource allocation per terminal. Next, the base station determines the resource amount of the selected terminals.

In step 1103, the base station allocates the resource to each terminal within the operating FAs of each selected terminal. The base station assigns each terminal the resource as much as the determined amount in step 1101 of the resources for the data transmission of the resources in the operating FAs of the terminal. Correspondingly, the physical location of the resource allocated to the terminal is determined.

In step 1105, the base station allocates the relative addresses to the RBs according to the addressing scheme for the n-th terminal of the selected terminals. Herein, n is initialized to '1' when this process commences. The base station allocates the relative addresses according to the addressing scheme corresponding to the operating FAs of the terminal among the addressing schemes of FIGS. 3 through 7. More particularly, the base station constitutes FA pairs as many as the quotient yielded by dividing the number of the FAs used by the n-th terminal by two (2) and allocates the consecutive relative addresses to the RBs within the FA pair. In so doing, the base station allocates the independent relative addresses per FA pair. When the number of the FAs used by the n-th terminal is not a multiple of two (2), the base station allocates the independent relative addresses to the RBs in the FA not constituted to the FA pair. When the RBs in the FA are divided into the diversity interval and the band selective interval, the base station allocates the mutually independent relative addresses in the diversity interval and the band selective interval.

In step 1107, the base station generates at least one resource indicator for the n-th terminal using the relative addresses. That is, the base station generates at least one resource indicator that represents the location of the RB assigned to the n-th terminal as the relative address.

In step 1109, the base station generates resource allocation information for the n-th terminal, including the at least one resource indicator. The base station generates the resource allocation information including the identifier of the n-th terminal, the MCS level, and the at least one resource indicator. Since the resource allocation information for the n-th terminal is transmitted through the primary FA of the n-th terminal, the at least one resource indicator is contained in one resource allocation information.

In step 1111, the base station checks whether the resource allocation information of every terminal selected in step 1101 is generated or not. When the resource allocation information of every terminal is not generated, the base station increases n by '1' in step 113 and goes back to step 1105.

When the resource allocation information of every terminal is generated, the base station generates the MAP message per FA in step 1115. More specifically, the base station classifies the resource allocation information based on the primary FA of the destination terminal of the resource allocation information, and generates the MAP message per FA including the classified resource allocation information. The base station can further add the ratio information of the diversity interval and the band selective interval of each FA to the MAP message. In some embodiments of the ratio information transmission, the base station sends the ratio information over the BCH.

In step 1117, the base station transmits the MAP message and the data. In particular, the base station divides the transmit data per FA and converts the MAP message and the bit stream of the transmit data to complex symbols by coding and modulating them. Next, the base station constitutes OFDM symbols by conducting Inverse Fast Fourier Transform (IFFT) and inserting Cyclic Prefix (CP) to the complex symbols, up-converts the OFDM symbols to a Radio Frequency (RF) band, and sends the RF signal via an antenna.

Figure 12:
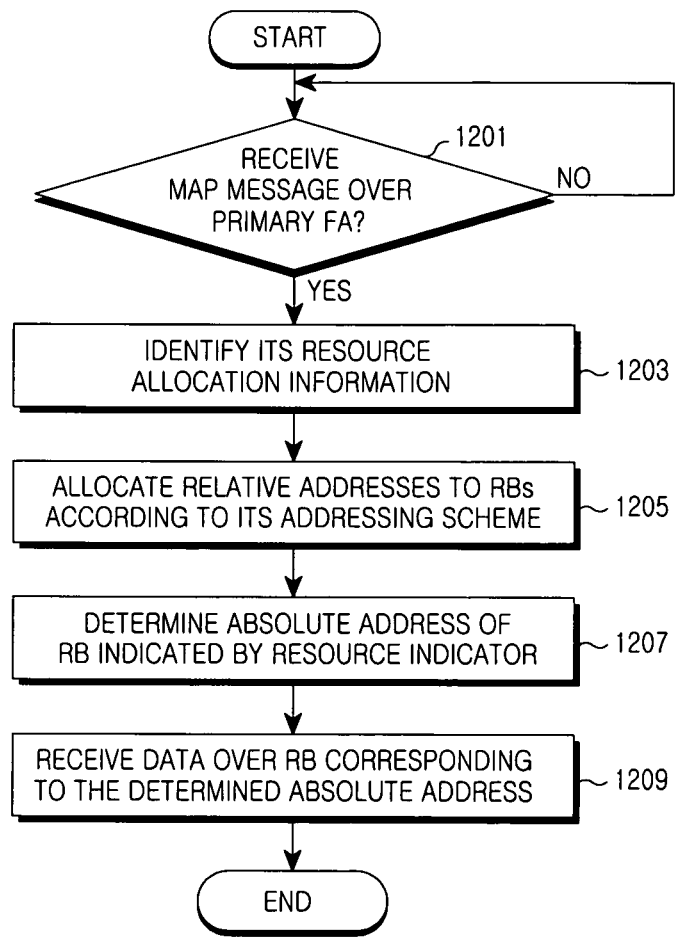
FIG. 12 illustrates a data receiving method of the terminal in the broadband wireless communication system according to an exemplary embodiment of the present invention.

FIG. 12 illustrates a data receiving method of the terminal in the broadband wireless communication system according to an exemplary embodiment of the present invention.

In step 1201, the terminal checks whether the MAP message is received in the primary FA.

Upon receiving the MAP message, the terminal identifies its resource allocation information from the resource allocation information contained in the MAP message in step 1203. That is, the terminal identifies its resource allocation information using the identifier in the resource allocation information.

In step 1205, the terminal allocates the relative addresses to the RBs in the operating FAs according to its addressing scheme. The terminal allocates the relative addresses according to the addressing scheme corresponding to its operating FAs among the addressing schemes of FIGS. 3 through 7. In particular, the terminal constitutes the FA pairs as many as the quotient yielded by dividing the number of the FAs used by the terminal by two (2) and allocates the consecutive relative addresses to the RBs within the FA pair. In so doing, the terminal allocates the independent relative addresses to the FA pairs. When the number of the FAs used by the terminal is not a multiple of two (2), the terminal allocates the independent relative addresses to the RBs in the FA not constituted to the FA pair. When the RBs in the FA are divided into the diversity interval and the band selective interval, the terminal allocates the mutually independent relative addresses in the diversity interval and the band selective interval. The terminal acquires the ratio information of the diversity interval and the band selective interval from the BCH or the MAP message.

In step 1207, the terminal determines the absolute address of the RB indicated by the at least one resource indicator contained in the resource allocation information. The terminal determines the relative address in the at least one resource indicator and determines the absolute address of the RB corresponding to the relative address. Namely, the terminal determines the absolute address of its assigned RB.

In step 1209, the terminal receives the data over the RB corresponding to the determined absolute address. The terminal down-converts the RF signal received over an antenna to a baseband signal, and restores the frequency-domain complex symbols using the CP elimination and the FFT operation. The terminal extracts the complex symbols mapped to the frequency domain within its assigned RBs amongst the complex symbols, and demodulates and decodes the extracted complex symbols.

Figure 13:
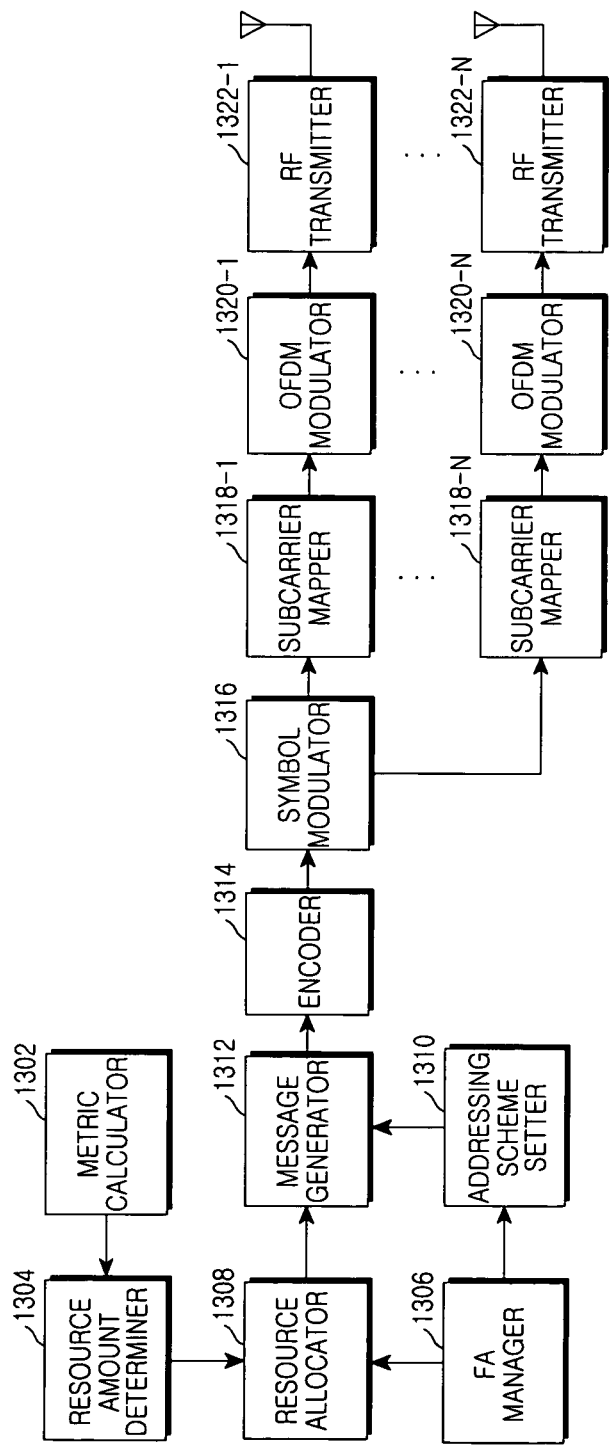
FIG. 13 illustrates a structure of the base station in the broadband wireless communication system according to an exemplary embodiment of the present invention.

FIG. 13 illustrates a block diagram of the base station in the broadband wireless communication system according to an exemplary embodiment of the present invention.

The base station of FIG. 13 includes a metric calculator 1302, a resource amount determiner 1304, an FA manager 1306, a resource allocator 1308, an addressing scheme setter 1310, a message generator 1312, an encoder 1314, a symbol modulator 1316, a plurality of subcarrier mappers 1318-1 through 1318-N, a plurality of OFDM modulators 1320-1 through 1320-N, and a plurality of RF transmitters 1322-1 through 1322-N.

The metric calculator 1302 calculates a priority metric of each terminal according to a scheduling algorithm. The metric calculator 1302 calculates the priority metric based on the scheduling parameters relating to the queue statue, the channel condition, the QoS requirements, the frequency overlay capability, and the resource allocation per terminal with respect to the accessed terminals. For example, a maximum throughput algorithm or a proportional fair algorithm can be adopted.

The resource amount determiner 1304 selects the terminals to be assigned the resource in the current frame or the current subframe according to the priority metric calculated by the metric calculator 1302. The resource amount determiner 1304 determines the MCS level and the resource allocation amount for each selected terminal. For example, the resource amount determiner 1304 determines the MCS level by considering the channel quality of each terminal and determines the resource allocation amount for each terminal based on characteristics of the service flow, the required resource amount, and grade of service.

The FA manager 1306 stores and manages the operating FA information of the terminal being accessed to the base station. The FA manager 1306 stores the operating FA information of the terminal determined in the SBC procedure in the process of the initial access of the terminal. Next, the FA manager 1306 provides the operating FA information of the terminal to the resource allocator 1308 and the addressing scheme setter 1310.

The resource allocator 1308 allocates the resource to each terminal. The resource allocator 1308 assigns the terminal the resource, of the resources for the data transmission of the resources in the operating FAs of the terminal, as much as the allocation amount determined by the resource amount determiner 1304. Thus, the physical location of the resource allocated to the terminal is determined.

The addressing scheme setter 1310 determines the addressing scheme for each terminal and allocates the relative addresses to be applied to each terminal according to the addressing allocation scheme. In particular, in the process of the initial access of the terminal, the addressing scheme setter 1310 determines the frequency overlay capability of the terminal and determines the operating FA of the terminal. Namely, the addressing scheme setter 1310 determines the operating FAs of the terminal; that is, how many FAs are supported and which FAs are supported by taking into account the frequency overlay capability information and the FA utilization status of the terminal received from the terminal in the process of the initial access.

The addressing scheme setter 1310 determines the addressing scheme for the terminal. In so doing, the base station preferentially determines whether to apply the individual addressing scheme or the integrated addressing scheme. When the integrated addressing scheme is applied, the addressing scheme setter 1310 determines the addressing scheme according to the operating FAs of the terminal. That is, based on the number of the operating FAs, the addressing scheme setter 1310 determines to apply one of the addressing schemes of FIGS. 3 through 6.

The addressing scheme setter 1310 allocates the relative addresses to apply to the terminal according to the determined addressing scheme. For example, as for the n-th terminal, the addressing scheme setter 1310 constitutes the FA pairs as many as the quotient yielded by dividing the number of the FAs used by the n-th terminal by two (2) and allocates the consecutive relative addresses to the RBs within the FA pair. In so doing, the addressing scheme setter 1310 allocates the independent relative addresses to the FA pairs. When the number of the FAs used by the n-th terminal is not a multiple of two (2), the addressing scheme setter 1310 allocates the independent relative addresses to the RBs in the FA not constituted to the FA pair. When the RBs of the FA are divided into the diversity interval and the band selective interval, the addressing scheme setter 1310 allocates the mutually independent relative addresses in the diversity interval and the band selective interval.

The message generator 1312 generates a control message transmitted to the terminal. For example, the message generator 1312 generates the resource indicators indicative of the location of the resource allocated to the terminal and generates the resource allocation information including the identifier of the terminal, the MCS level, and at least one resource indicator. The message generator 1312 generates the MAP message per FA including the resource allocation information. The message generator 1312 generates the MAP messages as many as the FAs, and the resource allocation information for the terminal is contained in the MAP message delivered in the primary FA of the operating FAs of the corresponding terminal. The representation of the resource allocation information differs in various embodiments. The message generator 1312 further can add the ratio information of the diversity interval and the band selective interval of each FA to the MAP message. Alternatively, in the ratio information transmission, the ratio information is not carried by the MAP message but transmitted over the BCH.

The encoder 1314 channel-codes the information bit stream output from the message generator 1312. The symbol modulator 1316 modulates and converts the channel-coded bit stream to complex symbols. The subcarrier mappers 1318-1 through 1318-N correspond to the FAs respectively and map the symbols to send over their corresponding FA into the frequency domain. The OFDM modulators 1320-1 through 1320-N correspond to the FAs respectively and constitute OFDM symbols to send over their corresponding FA. More particularly, the OFDM modulators 1320-1 through 1320-N convert the complex symbols mapped to the frequency domain to a time-domain signal using the IFFT, and constitute OFDM symbols by inserting the CP The RF transmitters 1322-1 through 1322-N, which correspond to the FAs respectively, up-convert the baseband signal to the RF signal of their corresponding FA and send the RF signal over an antenna.

Figure 14:
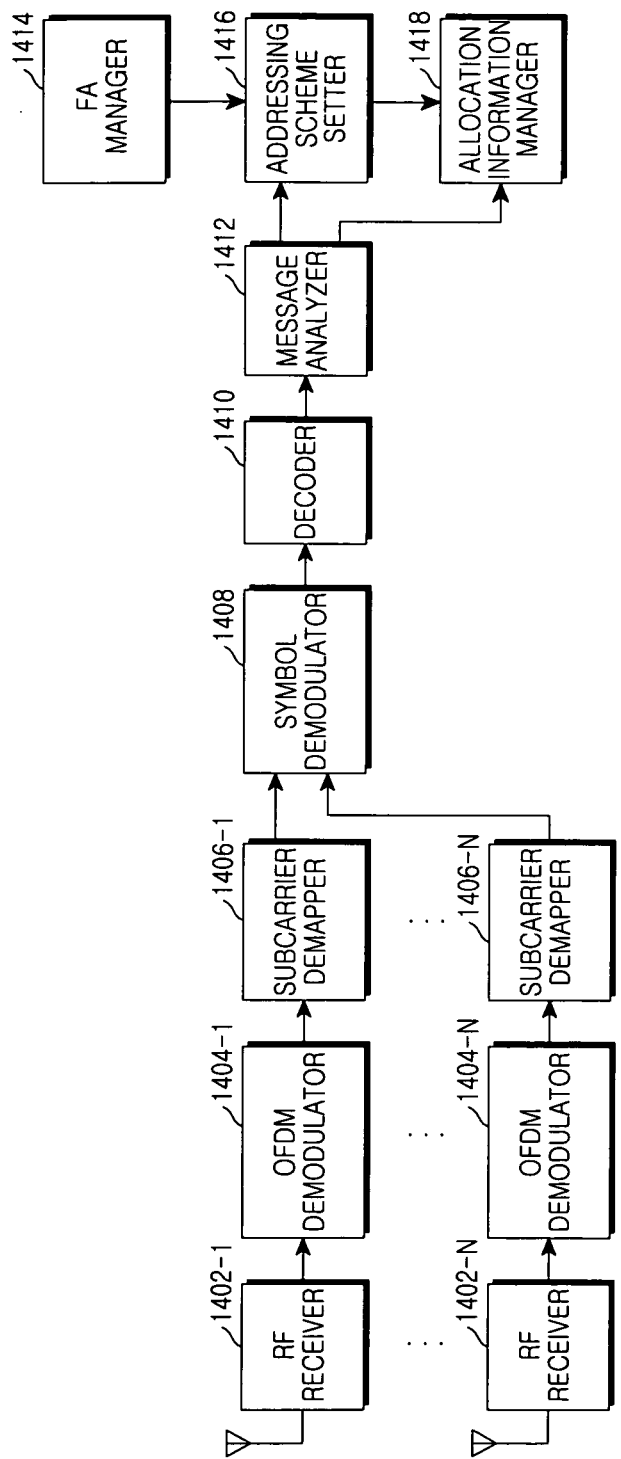
FIG. 14 illustrates a structure of the terminal in the broadband wireless communication system according to an exemplary embodiment of the present invention.

FIG. 14 illustrates a block diagram of the terminal in the broadband wireless communication system according to an exemplary embodiment of the present invention.

The terminal of FIG. 14 includes a plurality of RF receivers 1402-1 through 1402-N, a plurality of OFDM demodulators 1404-1 through 1404-N, a plurality of subcarrier demappers 1406-1 through 1406-N, a symbol demodulator 1408, a decoder 1410, a message analyzer 1412, an FA manager 1414, an addressing scheme setter 1416, and an allocation information manager 1418.

The RF receivers 1402-1 through 1402-N, which correspond to the FAs respectively, down-convert the RF signal of their corresponding FA to a baseband signal. The OFDM demodulators 1404-1 through 1404-N, which correspond to the FAs respectively, divide the baseband signal on the OFDM symbol basis, remove the CP, and restore the complex symbols mapped to the frequency domain using the FFT. The subcarrier demappers 1406-1 through 1406-N, which correspond to the FAs respectively, extract the signal mapped to the resource allocated to the terminal among the complex symbols mapped to the frequency domain. In so doing, the subcarrier mappers 1406-1 through 1406-N receive the location information of the allocated resource from the allocation information manager 1318. The symbol demodulator 1408 demodulates and converts the complex symbols output from the subcarrier demappers 1406-1 through 1406-N to a bit stream. The decoder 1410 restores the information bit stream by channel-decoding the bit stream.

The message analyzer 1412 analyzes the control message received from the base station. For example, the message analyzer 1412 analyzes the MAP message received in the primary FA of the terminal. Herein, the MAP message includes the resource allocation information for the terminals. The message analyzer 1412 identifies its resource allocation information from the resource allocation information of the MAP message. That is, the message analyzer 1412 identifies the resource allocation information for the terminal with the identifier contained in the resource allocation information. By analyzing at least one resource indicator in the resource allocation information for the terminal, the message analyzer 1412 determines the relative address of the RB indicated by the at least one resource indicator. The message analyzer 1412 provides the allocation information manager 1418 with the relative address of the allocated resource determined with the at least one resource indicator.

In the initial access to the base station, the message analyzer 1412 reads the operating FA information and the addressing scheme information received from the base station. For example, the operating FA information and the addressing scheme information are received through the SBC procedure. The operating FAs and the addressing scheme are determined by the base station by considering the frequency overlay capability and the FA utilization status. Although it is not specifically illustrated in FIG. 14, the terminal includes a transmitter for transmitting the frequency overlay capability information of the terminal.

The FA manager 1414 stores and manages the operating FA information of the terminal. The FA manager 1414 stores the operating FA information determined in the SBC procedure during the initial access of the terminal. The FA manager 1414 provides the operating FA information to the addressing scheme setter 1416.

The addressing scheme setter 1416 allocates the relative addresses to the RBs of the operating FAs according to the addressing scheme for the terminal. More specifically, the addressing scheme setter 1416 constitutes the FA pairs as many as the quotient yielded by dividing the number of the FAs used by the terminal by two (2) and allocates the consecutive relative addresses to the RBs within the FA pair. In so doing, the addressing scheme setter 1416 allocates the independent relative addresses to the FA pairs. When the number of the FAs used by the terminal is not a multiple of two (2), the addressing scheme setter 1416 allocates the independent relative addresses to the RBs in the FA not constituted to the FA pair. When the RBs of the FA are divided into the diversity interval and the band selective interval, the addressing scheme setter 1416 allocates the mutually independent relative addresses in the diversity interval and the band selective interval. The ratio information of the diversity interval and the band selective interval is acquired from the BCH or the MAP message. The addressing scheme setter 1416 provides the allocation result of the relative addresses to the allocation information manager 1418.

The allocation information manager 1418 manages the information of the resource allocated to the terminal, and provides the allocation information to the subcarrier demappers 1406-1 through 1406-N. The allocation information manager 1418 determines the absolute addresses; that is, the physical locations of the RBs allocated to the terminal using the allocation result of the relative addresses and the relative addresses of the allocated resource. The allocation information manager 1418 provides the subcarrier demappers 1406-1 through 1406-N with the location information of the resource corresponding to the absolute addresses.

In the light of the foregoing, the resource indication system is established according to the FA used in the broadband wireless communication system. Therefore, additional broadcasting information for other resource allocation is unnecessary, the simplified resource allocation information can be generated, and the overhead in the MAP message can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a base station in a wireless communication system supporting a frequency overlay scheme, the method comprising:
    allocating relative addresses to Resource Blocks (RBs) in operating Frequency Assignments (FAs) of a terminal according to an addressing scheme for the terminal, wherein the addressing scheme is determined based on a number of operating FAs of the terminal;
    generating at least one resource indicator represented with the relative addresses;
    generating resource allocation information which comprises the at least one resource indicator; and
    transmitting the resource allocation information through a primary FA of the terminal,
    wherein the allocating of the relative addresses comprises:
        constituting as many FA pairs as a quotient produced by dividing a number of the operating FAs of the terminal by two, wherein each of the FA pairs is a unit of which relative addresses are uniquely allocated;
        allocating consecutive relative addresses to the RBs in each FA pair, the relative addresses independent of each other with respect to each FA pair; and
        when the number of the operating FAs of the terminal is odd, allocating independent relative addresses to RBs in one of the FAs which is not constituted into the FA pair.

2. The method of claim 1, wherein the allocating of the relative addresses comprises:
    when RBs in each FA are divided into a diversity interval and a band selective interval, allocating mutually independent relative addresses in the diversity interval and the band selective interval.

3. The method of claim 1, further comprising:
    transmitting ratio information of a diversity interval and a band selective interval per FA using a broadcast channel or a MAP message.

4. The method of claim 1, further comprising:
    determining the operating FAs of the terminal by taking into account a frequency overlay capability of the terminal and FA utilization status when performing an initial access procedure of the terminal;
    determining an addressing scheme for the terminal according to the operating FA of the terminal; and
    transmitting operating FA information and addressing scheme information to the terminal.

5. The method of claim 4, wherein the determining of the addressing scheme for the terminal comprises:
    when a plurality of operating FAs grant to the terminal, determining whether to apply an individual addressing scheme or an integrated addressing scheme; and
    when determining to apply the integrated addressing scheme, determining the addressing scheme according to a number of the operating FAs.

6. The method of claim 1, wherein the RBs have a one-dimensional array structure in a single FA.

7. An operating method of a terminal in a wireless communication system supporting a frequency overlay scheme, the method comprising:
    reading at least one resource indicator contained in resource allocation information for the terminal;
    allocating relative addresses to Resource Blocks (RBs) in operating Frequency Assignments (FAs) of the terminal according to an addressing scheme for the terminal, wherein the addressing scheme is determined based on a number of operating FAs of the terminal;
    determining an absolute address of the RB indicated by the at least one resource indicator using the relative addresses; and
    receiving data over the RB corresponding to the absolute address,
    wherein the allocating of the relative addresses comprises:
        constituting as many FA pairs as a quotient produced by dividing a number of the operating FAs of the terminal by two, wherein each of the FA pairs is a unit of which relative addresses are uniquely allocated;
        allocating consecutive relative addresses to the RBs of each FA pair, the allocated relative addresses independent of each other with respect to each FA pair; and when the number of the operating FAs of the terminal is odd, allocating independent relative addresses to RBs in one of the FAs which is not constituted into the FA pair.

8. The method of claim 7, wherein the allocating of the relative addresses comprises:
when RBs in each FA are divided into a diversity interval and a band selective interval, allocating mutually independent relative addresses in the diversity interval and the band selective interval.

9. The method of claim 8, further comprising:
receiving ratio information of the diversity interval and the band selective interval per FA using a broadcast channel or a MAP message.

10. The method of claim 7, further comprising:
transmitting frequency overlay capability information of the terminal to the base station when performing an initial access procedure; and
receiving operating FA information and the addressing scheme information from the base station.

11. The method of claim 7, wherein the RBs have a one-dimensional array structure in a single FA.

12. An apparatus of a base station in a wireless communication system supporting a frequency overlay scheme, the apparatus comprising:
a setter configured to allocate relative addresses to Resource Blocks (RBs) in operating Frequency Assignments (FAs) of a terminal according to an addressing scheme for the terminal, wherein the addressing scheme is determined based on a number of operating FAs of the terminal;
a generator configured to generate at least one resource indicator represented with the relative addresses and to generate resource allocation information which comprises the at least one resource indicator; and
a transmitter configured to transmit the resource allocation information through a primary FA of the terminal,
wherein the setter is configured to constitute as many FA pairs as a quotient produced by dividing a number of the operating FAs of the terminal by two, wherein each of the FA pairs is a unit of which relative addresses are uniquely allocated, allocate consecutive relative addresses to the RBs of each FA pair, the relative addresses independent of each other with respect to each FA pair, and allocate independent relative addresses to RBs in one of the FAs which is not constituted into the FA pair when the number of the operating FAs of the terminal is odd.

13. The apparatus of claim 12, wherein, when RBs in each FA are divided into a diversity interval and a band selective interval, the setter is configured to allocate mutually independent relative addresses in the diversity interval and the band selective interval.

14. The apparatus of claim 13, wherein the transmitter is configured to transmit ratio information of a diversity interval and a band selective interval per FA using a broadcast channel or a MAP message.

15. The apparatus of claim 12, further comprising:
a manager configured to determine the operating FAs of the terminal by taking into account a frequency overlay capability of the terminal and FA utilization status when performing an initial access procedure of the terminal,
wherein the setter is configured to determine an addressing scheme for the terminal according to the operating FA of the terminal, and
the transmitter is configured to transmit operating FA information of the terminal and the addressing scheme information of the terminal to the terminal.

16. The apparatus of claim 15, wherein, when a plurality of operating FAs grant to the terminal, the setter is configured to determine whether to apply an individual addressing scheme or an integrated addressing scheme, and
when determining to apply the integrated addressing scheme, the setter is configured to determine the addressing scheme according to a number of the operating FAs.

17. The apparatus of claim 12, wherein the RBs have a one-dimensional array structure in a single FA.

18. An apparatus of a terminal in a wireless communication system configured to support a frequency overlay scheme, the apparatus comprising:
an analyzer configured to read at least one resource indicator contained in resource allocation information for the terminal;
a setter configured to allocate relative addresses to Resource Blocks (RBs) in operating Frequency Assignments (FAs) of the terminal according to an addressing scheme for the terminal, wherein the addressing scheme is determined based on a number of operating FAs of the terminal;
a manager configured to determine an absolute address of the RB indicated by the at least one resource indicator using the relative addresses; and
a demapper configured to extract data over the RB corresponding to the absolute address,
wherein the setter is configured to constitute as many FA pairs as a quotient produced by dividing a number of the operating FAs of the terminal by two, wherein each of the FA pairs is a unit of which relative addresses are uniquely allocated, allocate consecutive relative addresses to the RBs of each FA pair, the allocated relative addresses independent of each other with respect to each FA pair, and allocate independent relative addresses to RBs in one of the FAs which is not constituted into the FA pair when the number of the operating FAs of the terminal is odd.

19. The apparatus of claim 18, wherein, when RBs in each FA are divided into a diversity interval and a band selective interval, the setter is configured to allocate mutually independent relative addresses in the diversity interval and the band selective interval.

20. The apparatus of claim 19, further comprising:
a receiver configured to receive ratio information of the diversity interval and the band selective interval per FA using a broadcast channel or a MAP message.

21. The apparatus of claim 18, further comprising:
a transmitter configured to transmit frequency overlay capability information of the terminal to the base station when performing an initial access procedure; and
a receiver configured to receive operating FA information and the addressing scheme information from the base station.

22. The apparatus of claim 18, wherein the RBs have a one-dimensional array structure in a single FA.

* * * * *